United States Patent
Hanood

(10) Patent No.: US 6,956,473 B2
(45) Date of Patent: Oct. 18, 2005

(54) SELF-ADJUSTING ALARM SYSTEM

(75) Inventor: Scott T. Hanood, Malvern, OH (US)

(73) Assignee: JBS Technologies, LLC, Steubenville, OH (US)

( * ) Notice: Subject to any disclaimer, the term of this patent is extended or adjusted under 35 U.S.C. 154(b) by 93 days.

(21) Appl. No.: 10/752,054

(22) Filed: Jan. 6, 2004

(65) Prior Publication Data
US 2004/0140892 A1 Jul. 22, 2004

Related U.S. Application Data
(60) Provisional application No. 60/438,140, filed on Jan. 6, 2003.

(51) Int. Cl.$^7$ .................. G08B 13/00; G08B 13/08; G08B 29/00
(52) U.S. Cl. .................. 340/522; 340/426.11; 340/429; 340/541; 340/566
(58) Field of Search .................. 340/426.1, 429, 340/426.26, 426.27, 426.28, 541, 522, 566

(56) References Cited

U.S. PATENT DOCUMENTS

| | | | |
|---|---|---|---|
| 5,084,696 A | * | 1/1992 | Guscott et al. .......... 340/541 |
| 5,552,763 A | * | 9/1996 | Kirby .................. 340/506 |
| 5,612,670 A | | 3/1997 | Snyder et al. .......... 340/429 |
| 5,886,622 A | | 3/1999 | Snyder ................. 340/426 |
| 5,923,487 A | | 7/1999 | Carlson et al. ......... 360/60 |
| 6,018,431 A | | 1/2000 | Carlson et al. ......... 360/60 |
| 6,140,914 A | | 10/2000 | Mueller et al. ........ 340/426 |
| 6,317,034 B1 | | 11/2001 | Issa et al. ............ 340/426 |
| 6,720,875 B2 | * | 4/2004 | Philippe .............. 340/541 |

* cited by examiner

Primary Examiner—Jeffery Hofsass
Assistant Examiner—Lam Pham
(74) Attorney, Agent, or Firm—Rader, Fishman & Grauer PLLC

(57) ABSTRACT

An alarm system having the capability to self-adjust or self-calibrate itself is disclosed. The system includes an alarm controller and at least one sensor that generates a signal that corresponds to the magnitude of a detected event. The signal evaluator is part of the alarm controller and receives the magnitude signal from the sensor. The signal evaluator compares the magnitude signal to a user-defined or preset alarm sensor sensitivity threshold and generates an alarm signal if the magnitude signal exceeds the alarm signal sensitivity threshold. If repeated alarm signals are generated, an alarm threshold adjuster will adjust the sensor sensitivity threshold to a point where repeated magnitude signals will be ignored. The system will reset itself to the original user-defined or preset sensor sensitivity threshold levels after a predetermined time of no alarm signal generation. The alarm signals generated will activate an alarm annunciator, which generates an alarm.

12 Claims, 4 Drawing Sheets

SELF-ADJUSTING ALARM SYSTEM

CROSS REFERENCE

The present application claims benefit of U.S. provisional application Ser. No. 60/438,140, filed Jan. 6, 2003, the disclosure of which is hereby incorporated herein by reference in its entirety.

FIELD OF THE INVENTION

The present invention relates to alarm systems generally and, more particularly, to vehicle alarm systems.

BACKGROUND OF THE INVENTION

Alarm systems for installation in homes, businesses, or in movable vehicles such as automobiles are well known. These systems typically include an alarm controller that is coupled to an alarm annunciator and sensors located throughout the property or vehicle for detecting specific events indicative of a security violation. The alarm controller typically includes a microprocessor or microcontroller with sufficient memory and input/output (I/O) interface devices to effectively couple the controller to the sensors. Home or business alarm systems are typically powered from the standard household current, whereas vehicular alarm systems are typically powered from the battery source of the vehicle. Sometimes a backup battery is included for the alarm controller so the controller remains powered in the event an intruder cuts the power or battery cable.

A variety of sensors are used in such alarm systems. For example, the use of shock sensors in a vehicle to detect a potentially hostile shock, impact, or vibration to the vehicle are well known. See, for example, U.S. Pat. Nos. 6,317,034; 6,140,914; and 5,886,622. In addition to shock sensors, it is well known that motion detectors can be used in a vehicle to detect movement in a radiated field about the vehicle, or to detect the presence of an intruder in a home or business. Finally, vehicular radar detectors employ an alarm system whereby a driver is alerted to the possibility of his or her vehicle being radiated by a law enforcement personnel's radar gun.

One problem with these previously known systems is the susceptibility to false alarms. Vehicles are often parked in areas such as parking garages, shopping mall parking lots, or near heavily traveled roads, or railroad tracks, where they are susceptible to non-hostile vibrations and/or incidental or nonintrusive bumping or contact. In addition, various weather conditions can also cause nonintrusive and harmless contact or vibrations to a vehicle. For example, thunder, hail, or even heavy rain can, at times, trigger a false alarm on a vehicular, home, or business security system.

Similarly, motion detectors used in vehicles, homes, or businesses are susceptible to false alarms. For example, in a high-traffic area, a vehicle's motion detector may be falsely triggered simply by individuals opening a car door next to the alarmed vehicle or by individuals simply closely walking thereby. Similarly, in a home or business context, pets, internal air handling systems blowing papers, or external wind blowing branches next to windows can also trigger false alarms. In addition, in the context of vehicular radar detectors, various radiated energy can create a false indication of the presence of law enforcement radar where none exists.

False alarms from any of these systems are undesirable for a number of reasons. First, in the context of vehicular alarm systems, they tend to drain the vehicle's battery, thus impairing the alarm system's operation for when a valid alarm is warranted. This draining of a vehicle's battery can also impair the vehicle's ability to start when its driver returns. In addition, in vehicle, home, and business systems, frequent false alarms may be ignored by security personnel or bystanders. Moreover, when law enforcement personnel are dispatched in response to an alarm, an individual may be subject to a charge or fee for repetitive false alarms.

In an effort to remedy the false alarm problem, alarm systems have been developed that permit a user to adjust the sensitivity of the alarm for different situations. For example, an alarm system may be put in a test mode and then adjusted to the point of the desired input which will trigger or not trigger the alarm. In a vehicular alarm system, this is typically done by striking the vehicle with a force that is used by the alarm controller as the determinative alarm threshold. In a home or business context, a test may be done while a pet is present to adjust the alarm threshold to a point which a pet would not affect a motion sensor. While these methods give a user some control over the sensitivity of the alarm threshold setting, it does not provide for the situation where the detected input is of the magnitude exceeding the alarm threshold, but the input is still of the nature of an innocent and repetitive occurrence, e.g., the vibrations caused by a thunderstorm. What is needed is an alarm system that provides both the annunciation of an alarm in response to a hostile sensed event, while at the same time the ability to ignore non-hostile but repetitive and anomalous sensed events.

OBJECTS OF THE INVENTION

It is an object of the applicant's invention to improve the security of vehicles, homes, and businesses. It is also an object of the applicant's invention to reduce the number of false alarm annunciations. It is another objective of the applicant's invention to provide an improved alarm system which requires minimal, if any, operator adjustments.

SUMMARY OF THE INVENTION

The present invention achieves these objectives by utilizing self-adjusting or self-calibrating alarm system. More particularly, in accordance with the principles of the present invention, an alarm system is provided with a sensor for detecting an event and generating a magnitude signal corresponding to a magnitude of a detected event. In addition, a signal evaluator is operatively coupled to the sensor and generates a sensor-initiated alarm signal in response to the magnitude signal exceeding an alarm threshold. An alarm threshold adjuster is further operatively coupled to the signal evaluator for the purpose of adjusting the alarm threshold in response to the sensor-initiated alarm signals. Finally, the alarm system provides for a timer operatively coupled to the alarm threshold adjuster, whereby the frequency of the sensor-initiated alarm signals can be considered and evaluated in determining whether to adjust the alarm threshold.

In a preferred embodiment of the present invention, an alarm system includes an alarm controller that incorporates the signal evaluator in software. The magnitude signal from the sensor is provided to the alarm controller in digital form and the software programmed in accordance with the principles of the present invention compares the digital signal value to an alarm threshold. If the digital signal value is greater than the alarm threshold, an alarm is generated. If the digital signal value is less than the alarm threshold, the digital signal value is ignored and no response is generated.

Alternatively, the signal evaluator could receive an analog signal from the sensor indicative of the sensed event. The signal evaluator may compare the peak of the analog wave form to an alarm threshold to determine whether an alarm signal should be generated.

In a preferred embodiment of the present invention, the alarm threshold adjuster and timer are also implemented in software. The timing function determines the frequency of a sensed event and, in the case of frequent repetition, will trigger the alarm threshold adjuster to adjust the sensitivity threshold for which an alarm will sound.

The above and other objects and advantages of the present invention shall be made apparent from the accompanying drawings and the descriptions thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF THE INVENTION

Figure 1:
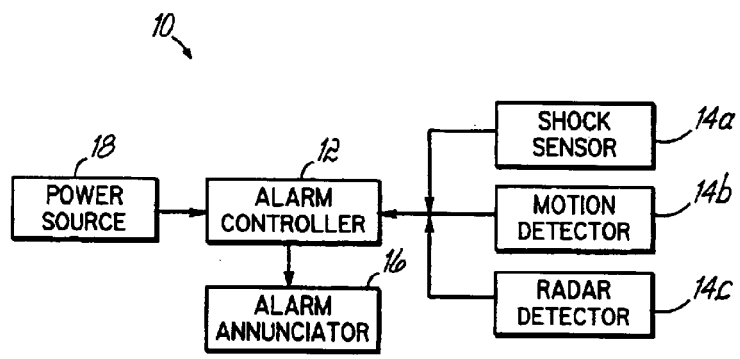
FIG. 1 is a block diagram of an alarm system.

A block diagram of an alarm system 10 incorporating the present invention is shown in FIG. 1. That system 10 includes an alarm controller 12 that is coupled to a shock sensor 14a, a motion detector 14b, and a radar detector 14c. The alarm controller 12 is also coupled to an alarm annunciator 16 which emits an alarm in response to an alarm signal from the alarm controller 12. The alarm emitted by the alarm annunciator 16 may be a siren, bell, vocal command, chirp, beep, warning light, or the like, or any combination thereof. The alarm controller 12 receives its power from a power source 18 which, in a vehicle, is typically the vehicle's battery, or, in a home or business, is typically the standard household current. The power source 18 may also include a backup battery source in the event a vehicle's main battery is inoperative or household current is unavailable for a building's alarm system. The use of a backup battery or rechargeable super capacitor is typically done to avoid alarm system 10 neutralization by cutting the battery cable, or in situations such as brown-outs or black-outs, where household current is unavailable.

In one embodiment of the present invention, the alarm controller 12 includes a C71P microcontroller manufactured by Microchip Technology Inc. of Chandler, Ariz., and is operated with a clocked frequency of 500 to 750 kilohertz. The microcontroller includes a processor, I/O interfaces, and memory, both volatile and non-volatile, for the operation of the controller. The program which controls the operation of the alarm controller 12 is contained within the non-volatile memory of the alarm controller 12.

While FIG. 1 shows the shock sensor 14a, the motion detector 14b, and the radar detector 14c operatively coupled to the alarm controller 12, it can be appreciated by those skilled in the art that other sensors or detectors 14 could also be included in this alarm system 10. Conversely, it can also be appreciated by those skilled in the art that an alarm system 10 may be comprised of any combination of the sensors or detectors 14 indicated, or known in the art, and that an alarm system 10 could be comprised of only a single sensor 14. In other words, an alarm system 10 for warning a driver of a vehicle of the presence of law enforcement may consist singularly of a radar detector 14c operatively coupled to an alarm controller 12, which receives its power from a vehicle's battery 18, or its own independent battery or power source 18, and may contain an audio and/or visual alarm annunciator 16, such as LEDs and/or chirps.

The sensors 14 coupled to the alarm controller 12 generate signals that indicate both that an event is occurring and the magnitude of the sensed event. For example, the shock sensor 14a may generate an analog signal that corresponds to the magnitude of a sensed vibration. In one embodiment, the shock sensor 14a is a piezo film strip 20 manufactured by AMP, Inc. of Harrisburg, Pa., which produces a digital pulse train in response to a vibration such as a blow or impact. The number of pulses generated within a predetermined time interval corresponds to the magnitude of the sensed vibration. Alternatively, the shock sensor 14a, or the alarm controller 12, may include an analog to digital (A/D) converter that converts an analog magnitude signal to a digital value that may be read by the alarm controller 12 in a parallel manner.

In a similar manner, the motion detector 14b may generate a signal indicative of the presence of a body of sufficient size, weight, and/or mass within a radiated field, such as in a room of a house or building, or it may generate a signal indicative of the proximity of the body to the motorized vehicle. Similarly, the radar detector 14c may generate a signal indicative of the presence of law enforcement radar radiation. In sum, for these and any other sensors 14, as long as the signal generated by the sensor 14 corresponds to a magnitude associated with the sensed event, evaluation of the signal may be performed in accordance with the principles of the present invention.

Figure 2:
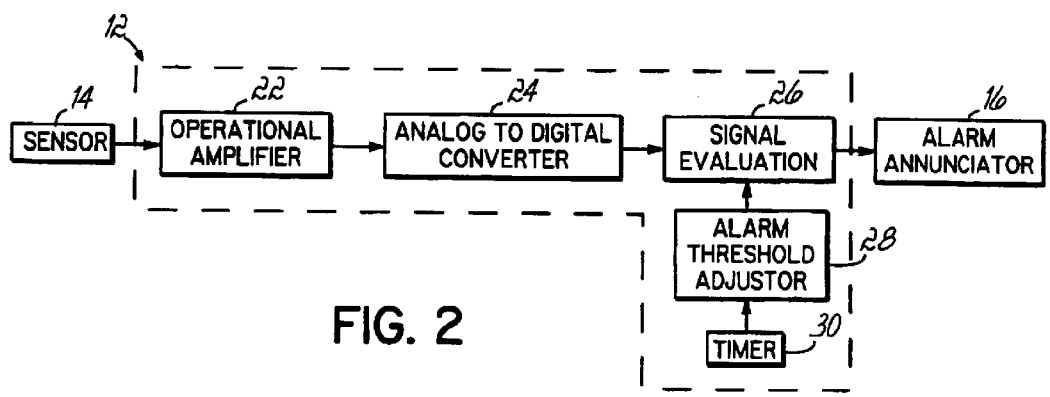
FIG. 2 is a block diagram of an alarm controller.

FIG. 2 further illustrates the components of one embodiment of the alarm controller 12. As shown, a signal from a sensor 14 will proceed through an operational amplifier 22 and then through an analog to digital (A/D) converter 24. The digitized signal is then evaluated by a signal evaluator program module 26 which is typically contained within the memory of the alarm controller 12. This signal evaluator module 26 evaluates the signals received from the various sensors 14 to determine whether the alarm controller 12 should generate a sensor-initiated alarm signal which in turn will activate the alarm annunciator 16. For each of the sensors 14 that generate a magnitude signal, the evaluator 26 compares the magnitude signal to an alarm threshold. When the magnitude signal from any sensor 14 exceeds the alarm threshold, an alarm signal is sent to the alarm annunciator 16.

The memory of the alarm controller 12 also contains an alarm threshold adjuster program module 28. This module 28 adjusts the sensitivity of the alarm threshold. Typically, this is done automatically and in response to the frequency of generated alarm signals. A timing program module 30 also contained within the memory of the alarm controller 12 furthers the determination of when the alarm threshold should be adjusted. Finally, the alarm threshold adjuster program module 28 is capable of either increasing or decreasing the sensitivity of the alarm threshold in response to the frequency and magnitude of sensed events.

Figure 3:
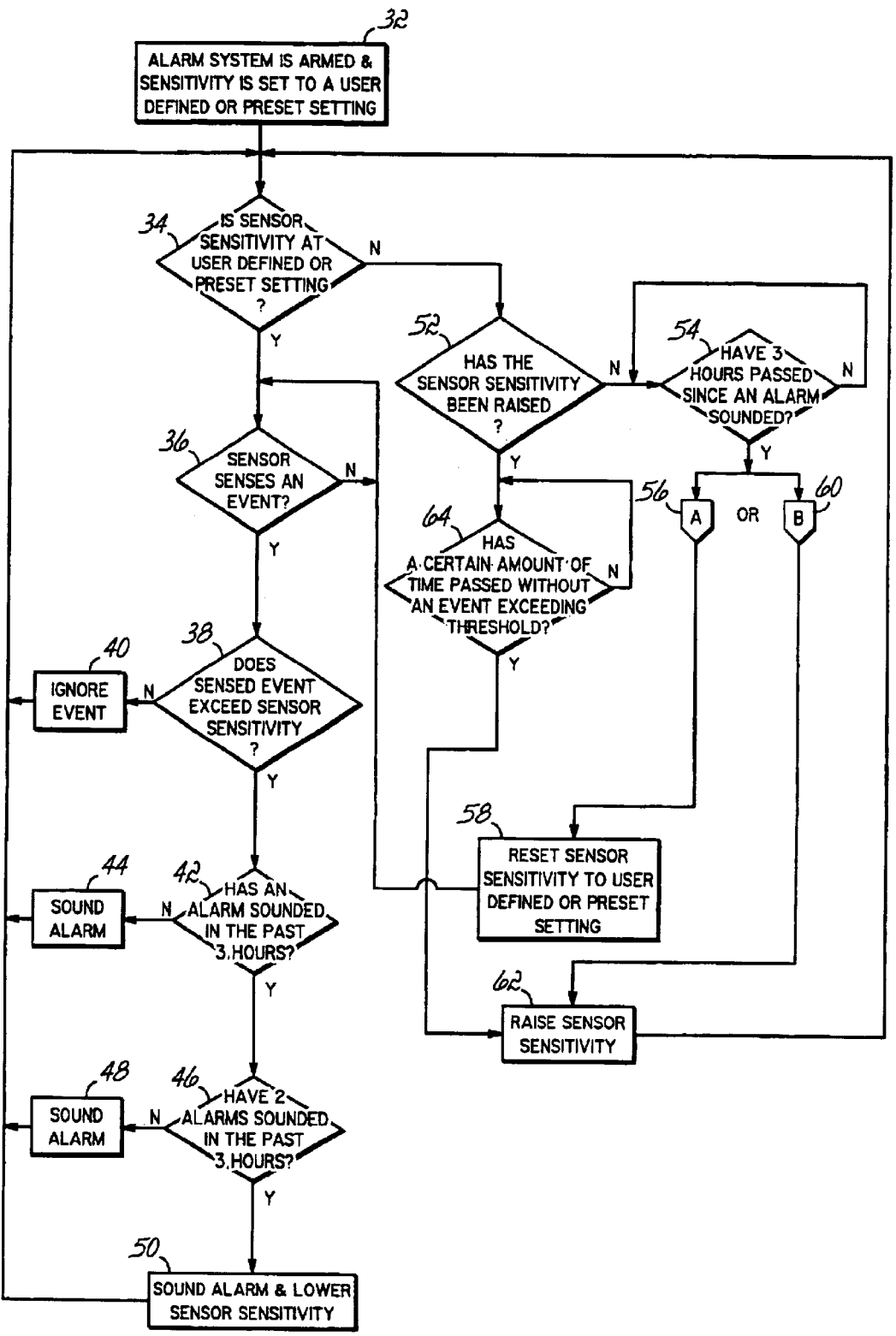
FIG. 3 is a flow chart of the process performed by the alarm system.

The flow chart shown in FIG. 3 depicts the representative processing performed by the alarm controller 12 in response to input from a sensor 14. Initially, the alarm system 10 is armed by a user and the sensitivity of the alarm sensors 14 is set to a user-defined or preset setting (Block 32). After being armed, the alarm system 10 will periodically evaluate whether a sensor's 14 sensitivity is at the user defined or preset level or whether it has been adjusted since being armed (Block 34). The arming of alarm system 10 also enables the alarm sensors 14 to sense or detect an event (Block 36). When the alarm sensor 14 senses an event, for example, the shock sensor 14a senses a shock, the signal evaluator 26 determines whether the sensed event exceeds the alarm sensitivity (Block 38). For example, in the case of a shock sensor 14a, if the shock, impact, or vibration does not exceed the shock sensor 14a sensitivity setting, the shock is ignored (Block 40). However, if the sensed event does exceed the alarm sensitivity setting, the alarm controller 12 makes a second determination of whether an alarm has sounded in the past three hours (Block 42). If an alarm has not sounded in the past three hours, an alarm signal is sent to the alarm annunciator 16, which sounds an alarm (Block 44). It can be appreciated by those skilled in the art that the time period for evaluating whether an alarm signal has been generated could be programmed or set to be greater or lesser than three hours without detracting from the nature and objectives of the present invention.

If an alarm signal has been generated during a certain amount of time, e.g., three hours, the alarm controller 12 further evaluates whether two alarm signals have been generated during the last three hours (Block 46). If only one alarm has been annunciated during the last three hours, an alarm signal is generated and an alarm is sounded (Block 48). It can also be appreciated that the sounding or annunciating of an alarm (Block 44, 48, 50) by an alarm annunciator 16 can be in the form of an audio or visual, or any combination thereof, warning.

If two or more alarm signals have been generated in the last three hours, an alarm signal is again generated, and the sensitivity of the alarm sensor 14 is lowered (Block 50). The degree to which the sensitivity of the alarm sensor 14 is lowered can be preset, user-defined and/or adjusted, or can be dynamically determined based on the frequency and magnitude of the sensed inputs.

After the alarm controller 12 acts upon the magnitude signal generated by a sensor 14, regardless of whether the action is to ignore the event (Block 40), sound an alarm (Blocks 44, 48), or sound an alarm and lower the sensor 14 sensitivity (Block 50), the alarm sensor 14 will again wait for an alarm-worthy event (Block 36). However, if the sensor 14 sensitivity is no longer at the user-defined or preset setting (Block 34), the alarm controller 12 will further determine whether the sensor 14 sensitivity has been raised (Block 52). If the sensor 14 sensitivity has not been raised, the alarm controller 12 will then evaluate whether a certain period of time has passed, e.g., three hours, since an alarm signal was generated (Block 54). If a certain amount of time has passed without any alarm signals being generated, the alarm threshold adjuster 28 will either (A) (Block 56) reset the sensor 14 sensitivity to the user-defined or preset level (Block 58) or will (B) (Block 60) incrementally raise the sensor 14 sensitivity (Block 62). In embodiment (A) (Block 56), after the sensor 14 is reset to the user defined or preset level (Block 58), the alarm sensor 14 continues to wait for sensed events (Block 36). In embodiment (B) (Block 60), the degree to which the sensor 14 sensitivity is increased can be preset, user-defined or adjusted, or calculated based on the frequency and magnitude of prior sensed events. After raising the sensor 14 sensitivity (Block 62), another determination is made whether the sensor 14 sensitivity has returned to the user-defined or preset setting (Block 34). If the sensor 14 sensitivity is still less than the user-defined or preset setting, and now in this case since the sensor 14 sensitivity has been raised (Block 52), a further determination is made whether a certain period of time has passed at the raised sensor 14 sensitivity without an event exceeding threshold occurring (Block 64). If there has not been an event that exceeds the alarm threshold for a requisite period of time, the sensor 14 sensitivity will continue to be raised (Block 62) until it reaches the user-defined or preset setting (Block 34).

Applying this process to a shock sensor 14a in the context of a thunderstorm can further illustrate the present invention. While rolling thunder may initially set off a shock sensor 14a, the alarm system 10 will eventually self-adjust or re-calibrate itself to the point that an alarm signal is no longer generated in response to a clap of thunder. However, as the storm clouds move out of the area, over time, the alarm system 10 will again self-adjust or re-calibrate itself back to the shock sensor 14a sensitivity originally defined by a user or preset by a manufacturer.

Figure 4:
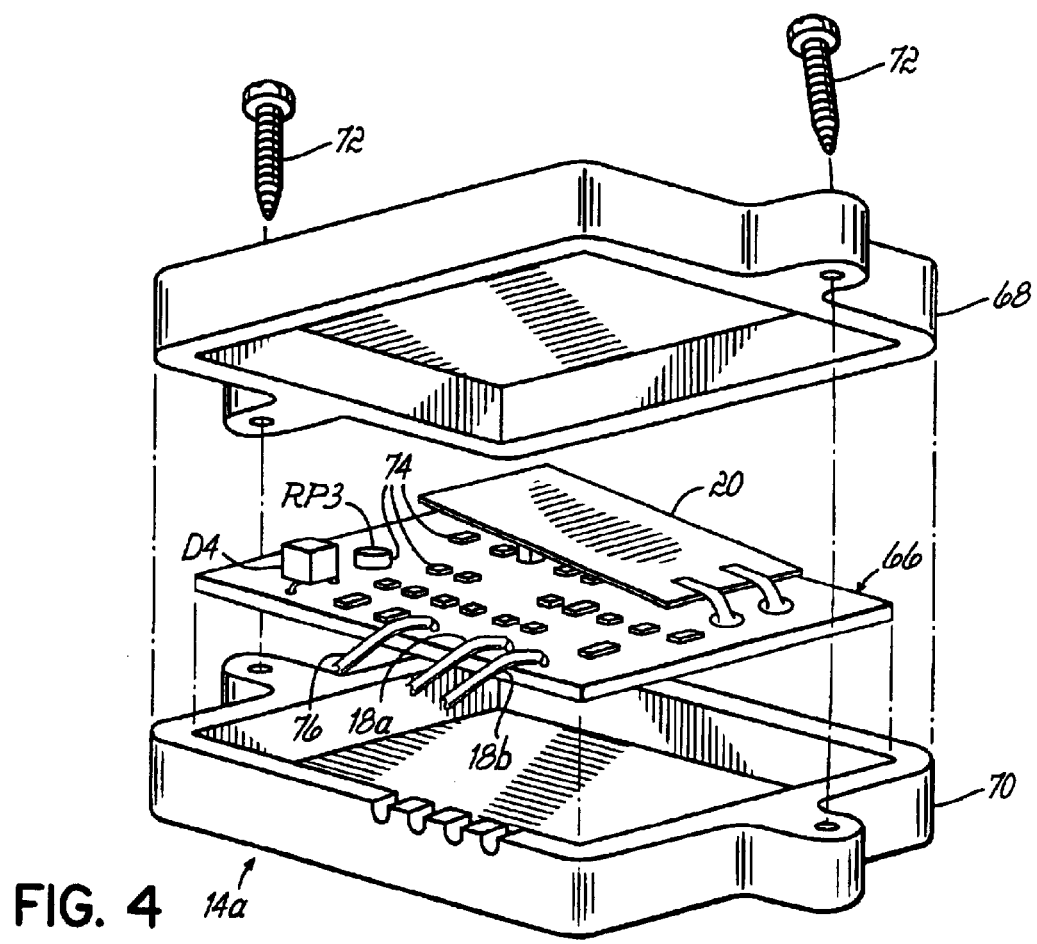
FIG. 4 is a disassembled illustration of a shock sensor.

FIG. 4 is an illustration of a representative shock sensor 14a of the present invention, which is also described in U.S. Pat. No. 5,612,670, and is expressly incorporated by reference herein in its entirety. The shock sensor 14a includes a printed circuit board 66 and optionally may be encased within a plastic housing formed of two half-layers 68 and 70. The housing halves may be secured together by an adhesive or by screws 72 that allow the detector to be mounted on a building or vehicle. The circuit board 66 is preferably manufactured using surface-mount technology, thereby minimizing the size of the shock sensor 14a. The circuit board 66 includes a number of surface-mounted components 74 such as resistors, capacitors, diodes, transistors, and an integrated circuit containing four operational amplifiers, as is more specifically detailed in FIG. 5. Also included is a strip 20 of piezoelectric material, a light-emitting diode (LED) D4, and a potentiometer RP3.

The shock sensor 14a operatively communicates with the alarm controller 12 when an electric signal is produced by the piezoelectric strip 20. The strip 20 has piezoelectric crystals incorporated into its structure. The crystals generate a pulse of electricity in response to vibrations produced by motions which are sensed by the circuitry on the circuit board. For example, in the present invention, the shock sensor 14a will operatively send a signal to the alarm controller 12 when the vehicle is moved. As described more below, if this electrical signal exceeds a threshold (which is set by software or by adjustment of the corresponding potentiometer RP3), the circuitry on the circuit board signals the alarm controller 12.

Three terminals 76, 18a, 18b lead from the circuit board 66. Wires 18a, 18b are connected to a power source 18, such as standard household current or a vehicle's battery system. Wire 76 operatively connects the shock sensor 14a with the alarm controller 12. Furthermore, the light-emitting diode (LED) D4 is illuminated when a shock is detected, thus providing a visual signal of motion, which can be used during installation when adjusting the potentiometer RP3 to an appropriate threshold level.

Figure 5:
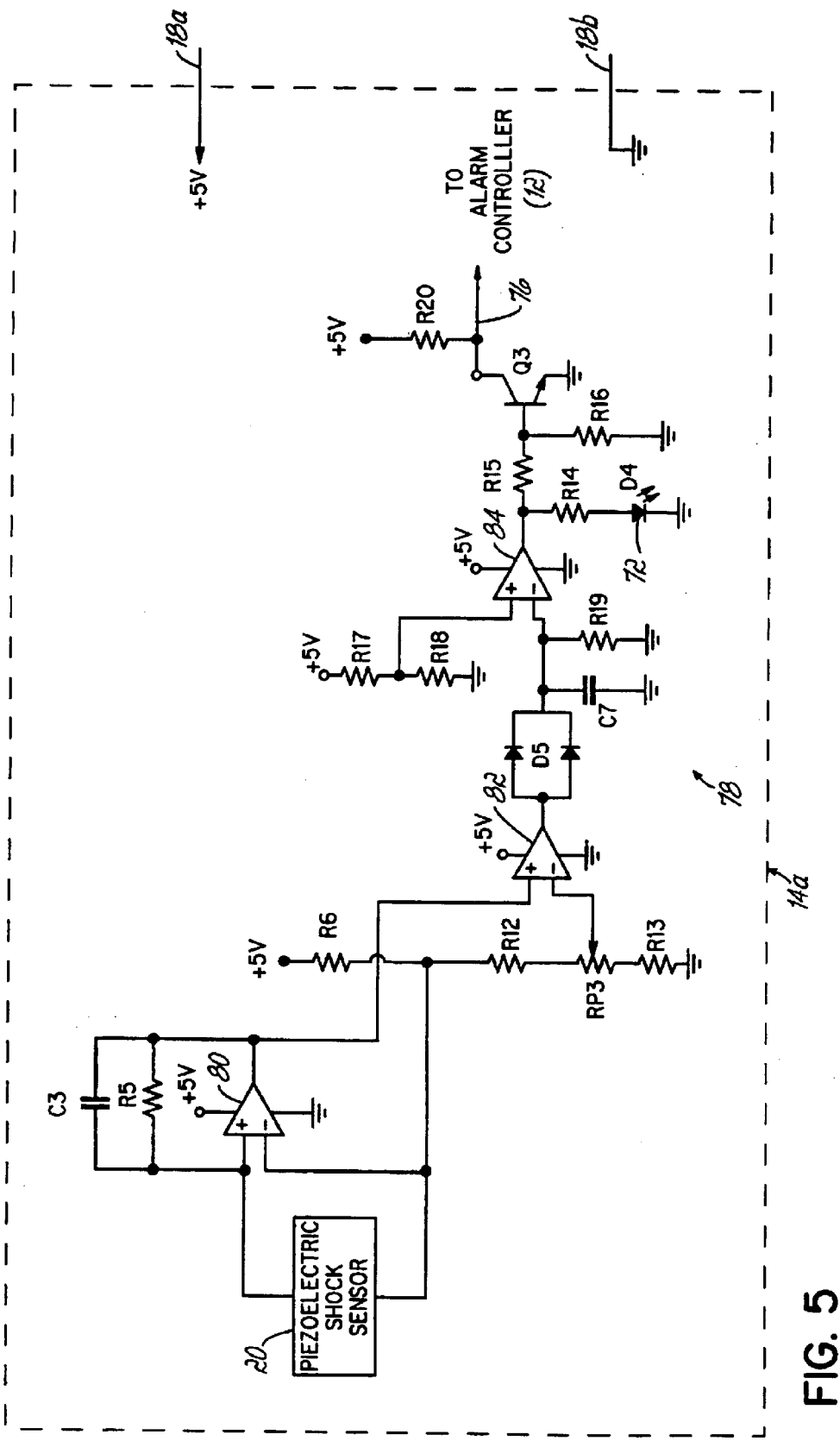
FIG. 5 is a circuit diagram of the circuitry included in the shock sensor of FIG. 4.

While preferably much of the functions of the present invention while be accomplished through software, FIG. 5 further illustrates a circuit 78 of a representative shock sensor 14a such as that shown in FIG. 4 which could be adapted for by those skilled in the art for use in the present invention. In accordance with the principles of the present invention, is configured for connection to and interaction with the alarm controller 12. Inside of circuit 78, transistor Q3 is connected between terminal 76 and ground. When transistor Q3 is active, the corresponding terminal 76 is connected to ground, thus signaling the alarm controller 12. When transistor Q3 is not active, resistor R20 pulls terminal 76 to the positive power supply voltage.

Transistor Q3 is activated by analog circuitry, which processes electrical vibration signals produced by sensor 20, which may be, for example, a piezoelectric strip 20, available as Part No. 10027941, from AMP Inc., Post Office Box 3608, Harrisburg, Pa. 17105.

Sensor 20 is connected differentially across the input terminals of an operational amplifier 80. Amplifier 80 produces a low-pass filtered version of the vibration signals from sensor 20 (low-pass filtering is provided by capacitor C3 and resistor R5, the values of which, when multiplied together, produce a time constant of approximately three (3) milliseconds).

The filtered output of amplifier 80 is fed to the non-inverting inputs of operational amplifier 82, which is wired as a comparator. The inverting input of amplifier 82 is connected to the wiper potentiometer RP3. Thus, amplifier 82 compares the voltage of the filtered analog signal from amplifier 80 to a threshold voltage which is generated by adjusting potentiometer RP3. If the filtered vibration signal from amplifier 80 exceeds the threshold, the output of amplifier 84 saturates at the positive supply voltage.

The output of amplifier 82 is not directly coupled to transistor Q3; instead, the output of operational amplifier 82 is connected to a sample-and-hold circuit comprising two parallel diodes D5, a capacitor C7, and a resistor R19. Operational amplifier 84, which is wired as a comparator, compares the voltage of capacitor C7 at its inverting input to a reference voltage at its non-inverting input; the reference voltage is generated by resistors R17 and R18, which are wired as a voltage divider and produce a voltage of approximately one-sixth of the power supply voltage.

When the output of amplifier 82 is positive (indicating that the filtered vibration signal from amplifier 80 exceeds the threshold set by potentiometer RP3), capacitor C7 charges to a voltage near to the power supply voltage. Because this capacitor voltage exceeds one-sixth of the power supply voltage, the output of amplifier 84 saturates at the power supply voltage. Amplifier 84 is connected to transistor Q3; thus, when amplifier 84 saturates at the power supply voltage, transistor Q3 is activated, sending a signal to the alarm controller 12 via terminal 76.

If the filtered vibration signal from amplifier 80 falls below the threshold set by potentiometer RP3, the output of amplifier 82 saturates at the ground voltage. In this situation, diodes D5 turn off and, therefore, capacitor C7 remains charged near to the positive power supply voltage. Thus, even after the filtered vibration signal falls below the threshold, amplifier 84 will remain saturated at the power supply voltage, and transistor Q3 will remain activated.

If, however, the filtered vibration signal remains below the threshold set by potentiometer RP3 for any period of time, capacitor C7 would discharge through resistor R19. The rate of discharge is determined by the product of the values of resistor R19 and capacitor C7, and has a time constant of about ten (10) to about thirty (30) seconds. Thus, if the filtered vibration signal remains below the threshold for longer than the present time constant, capacitor C7 would discharge to a voltage less than one-sixth of the power supply voltage. When this occurs, amplifier 84 will, as a result, saturate at the ground voltage, and transistor Q3 would deactivate and no longer operatively signal the alarm controller 12.

From the foregoing, it should be apparent that the present invention may be practiced with any alarm controller 12 that receives a sensor 14 signal that corresponds to the magnitude of a detected event, as long as the magnitude of the detected event has a range in which an alarm threshold may be established. Although the signal evaluator 26, alarm threshold adjuster 28, and timing functions 30 of the preferred embodiment are implemented in software, hardware similar to that illustrated in FIG. 4, and described herein, could also be used to accomplish these functions. Such hardware would include interface circuitry for the sensor 14 signal, and the signal evaluator 26, alarm threshold adjustor 28, timer 30, as well as circuitry for each of these components and/or functions.

The reader should further appreciate that the present invention may also be accomplished by means known in the art for accomplishing the functions thereof. Thus, the present invention is not strictly limited to the disclosed components for carrying out the intended functions and objectives of the invention.

Finally, the reader should appreciate that the present invention encompasses a method for adjusting the sensitivity of an alarm system 10 comprising the steps of generating a magnitude signal by a sensor 14 corresponding to a magnitude of a detected event, comparing the magnitude signal to an alarm threshold, generating a sensor-initiated alarm signal in response to the magnitude signal when it exceeds the alarm threshold, and adjusting the alarm threshold based on the magnitude signals and the frequency thereof.

While the present invention has been illustrated by a description of various embodiments and while these embodiments have been described in considerable detail, it is not the intention of the applicant to restrict or in any way limit the scope of the claims to such detail. Additional advantages and modifications will readily appear to those skilled in the art. The invention in its broader aspects is, therefore, not limited to the specific details, representative apparatus and method, and illustrative examples shown and described. Accordingly, departures may be made from such details without departing from the spirit or scope of the applicant's general inventive concept.

What is claimed is:

1. An alarm system comprising:
   a sensor for detecting an event, the sensor generating a magnitude signal corresponding to a magnitude of a detected event;
   a signal evaluator operatively coupled to the sensor, the signal evaluator generating a sensor-initiated alarm signal in response to the magnitude signal exceeding an alarm threshold;
   an alarm threshold adjustor operatively coupled to the signal evaluator whereby the alarm threshold can be adjusted in response to the sensor-initiated alarm signals; and
   a timer operatively coupled to the alarm threshold adjustor whereby the frequency of the sensor-initiated alarm signals can be evaluated in adjusting the alarm threshold.

2. The system of claim 1, wherein the sensor is a shock sensor that generates the magnitude signal corresponding to a sensed vibration.

3. The system of claim 2, wherein the magnitude signal generated by the shock sensor is a pulse train that corresponds to the sensed vibration.

4. The system of claim 1, wherein the sensor is a motion detector that generates the magnitude signal corresponding to a proximity of a body within a field radiated by the motion detector.

5. The system of claim 1, wherein the sensor is a radar detector that generates the magnitude signal corresponding to the strength of the radiation sensed by the radar detector.

6. The system of claim 1, wherein the alarm threshold adjustor is automatically adjusted in response to the sensor-initiated alarm signals.

7. The system of claim 1, wherein the alarm threshold adjustor is automatically adjusted in response to a lack of sensor-initiated alarm signals for a period of time.

8. The system of claim 7, wherein the alarm threshold adjustor is automatically incrementally adjusted in response to a lack of sensor-initiated alarm signals for a period of time.

9. The system of claim 1 further comprising:

an alarm annunciator coupled to the signal evaluator, the alarm annunciator generating an alarm in response to the alarm signal.

10. The system of claim 9, wherein the generated alarm is one of a vocal alarm, a siren, a horn, a bell, a chirp, a tone, and a light.

11. An alarm system comprising:

a means for detecting an event, the means generating a magnitude signal corresponding to a magnitude of a detected event;

a means for evaluating the magnitude of a detected event operatively coupled to the means for detecting an event, the means for evaluating the magnitude of a detected event generating a sensor-initiated alarm signal in response to the magnitude signal exceeding an alarm threshold;

a means for adjusting the alarm threshold operatively coupled to the means for evaluating the magnitude of a detected event whereby the alarm threshold can be adjusted in response to the sensor-initiated alarm signals; and a means for timing operatively coupled to the means for adjusting the alarm threshold whereby the frequency of the sensor-initiated alarm signals can be evaluated in adjusting the alarm threshold.

12. A method for adjusting the sensitivity of an alarm system comprising:

generating a magnitude signal by a sensor corresponding to a magnitude of a detected event;

comparing the magnitude signal to an alarm threshold;

generating a sensor-initiated alarm signal in response to the magnitude signal exceeding the alarm threshold; and adjusting the alarm threshold based on the magnitude signals and a frequency thereof.

* * * * *